United States Patent [19]

Stolz et al.

[11] Patent Number: 4,724,898

[45] Date of Patent: Feb. 16, 1988

[54] SYSTEM FOR THE AIR-CONDITIONING OF THE INTERIOR OF A MOTOR VEHICLE

[75] Inventors: Albert Stolz, Tuebingen; Hans Trube, Herrenberg, both of Fed. Rep. of Germany; Hermann Grimm, deceased, late of Ostelsheim, Fed. Rep. of Germany, by Christel Grimm, administratrix; Klaus Arold, Sindelfingen; Manfred Mordau, Wildberg, both of Fed. Rep. of Germany

[73] Assignee: Daimler-Benz Aktiengesellschaft, Stuttgart, Fed. Rep. of Germany

[21] Appl. No.: 866,442

[22] Filed: May 23, 1986

[30] Foreign Application Priority Data

May 23, 1985 [DE] Fed. Rep. of Germany ....... 3518494

[51] Int. Cl.$^4$ ............................................. B60H 1/06
[52] U.S. Cl. ........................................ 165/43; 165/42; 237/12.3 B; 237/43
[58] Field of Search ............... 165/41, 42, 43, 140; 237/12.3 B, 43

[56] References Cited

U.S. PATENT DOCUMENTS

| | | | |
|---|---|---|---|
| 2,054,403 | 9/1936 | Yeager | 165/140 |
| 2,236,476 | 3/1941 | Findley | 237/12.3 B |
| 3,753,462 | 8/1973 | Burger | 237/12.3 B |
| 3,999,598 | 12/1976 | Fehr et al. | 165/42 |
| 4,460,036 | 7/1984 | Yoshimi et al. | 165/42 |

FOREIGN PATENT DOCUMENTS

| | | | |
|---|---|---|---|
| 1530564 | 1/1970 | Fed. Rep. of Germany | 237/12.3 B |
| 1962665 | 7/1971 | Fed. Rep. of Germany | 237/12.3 B |
| 2123945 | 11/1972 | Fed. Rep. of Germany | 237/43 |
| 3236620 | 4/1983 | Fed. Rep. of Germany | 165/140 |
| 3218710 | 7/1983 | Fed. Rep. of Germany | 237/12.3 B |
| 727548 | 6/1932 | France | 237/12.3 B |

Primary Examiner—William R. Cline
Assistant Examiner—John K. Ford
Attorney, Agent, or Firm—Barnes & Thornburg

[57] ABSTRACT

A system for the air-conditioning of the interior of a motor vehicle having an engine cooling circuit is provided which has a water/air heat exchanger and a water/water heat exchanger connected in series in the engine cooling circuit. The water/air heat exchanger is arranged upstream of the water/water heat exchanger. The water/water heat exchanger is between the water/air heat exchanger and panel heat exchangers which are located in the interior of the vehicle.

5 Claims, 2 Drawing Figures

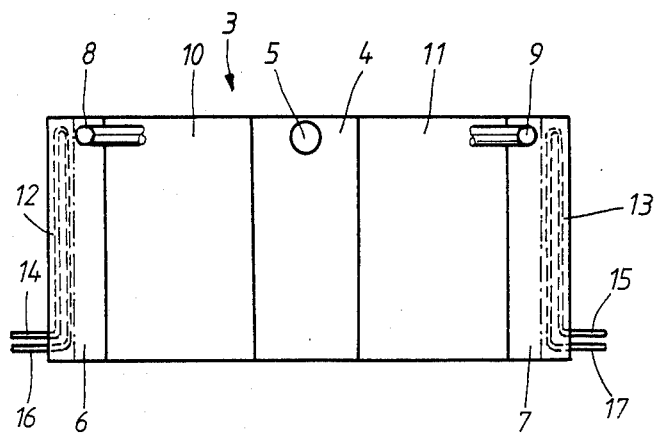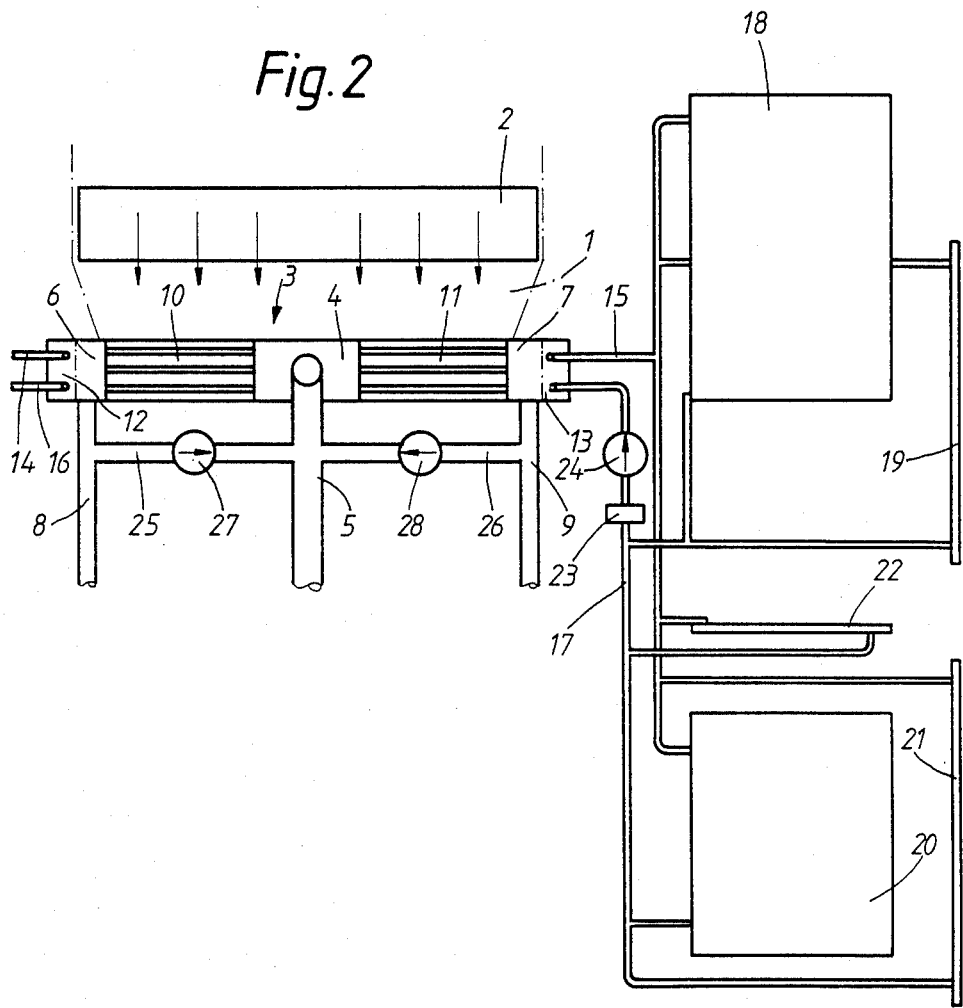

4,724,898

SYSTEM FOR THE AIR-CONDITIONING OF THE INTERIOR OF A MOTOR VEHICLE

BACKGROUND AND SUMMARY OF THE INVENTION

The present invention relates to a system for the air-conditioning of the interior of a motor vehicle having an engine cooling circuit which has a water/air heat exchanger and a water/water heat exchanger. The system also includes panel heat exchangers in the interior through which water flows from the water/water heat exchanger.

An example of the above-system type is shown in German Published Unexamined Patent Application No. 3,218,710. In this system, the water/air heat exchanger and the water/water heat exchanger are arranged in two parallel line branches of the cooling-water circuit. This requires separate control devices for the two line branches and separate heat exchangers, and is relatively expensive to construct.

An objective of the present invention is to provide a simplified air-conditioning system that reduces the construction expenses and simplifies the controls.

These and other objectives are achieved by providing in a system of the above-described type a water/air heat exchanger and a water/water heat exchanger which are connected in series. The water/water heat exchanger is downstream of the water/air heat exchanger in the engine cooling circuit, and is arranged between the panel heat exchangers and the water/air heat exchanger.

An advantage of a preferred embodiment of the invention is its very compact design, with only one line branch and only one control device for the cooling water. Since the cooling water first flows through the water/air heat exchanger, it is sufficiently cooled in the water/water heat exchanger to prevent undesirable high temperatures from occurring in the panel heat exchangers.

Another advantage provided by a preferred embodiment is allowing the water/water heat exchanger to be built onto a conventional water/air heat exchanger, without the latter having to undergo considerable conversion.

By arranging an evaporator upstream of the water-/air heat exchanger, as provided in a further embodiment of the invention, the panel heat exchanger can cool the interior in a simple manner.

The provision of a circulating pump between a return pipe and a feed pipe leading to the water/air heat exchanger aids the flow of cooling water between the two heat exchangers, especially when they are separated from the remaining engine cooling-water circuit, for example under cooling conditions.

Further objects, features and advantages of the present invention will become more apparent from the following description when taken with the accompanying drawings, which show for purpose of illustration only, an embodiment constructed in accordance with the present invention.

BRIEF DESCRIPTION OF THE DRAWINGS

FIG. 1 is a side view of the preferred embodiment of the present invention, and

FIG. 2 is a schematic plan view of the present invention.

DETAILED DESCRIPTION OF THE DRAWINGS

As shown in FIG. 2, an evaporator 2 of a cooling system not shown in detail is arranged in an air channel 1. Downstream of the evaporator 2 is a water/air heat exchanger 3, through which the cooling water of an internal-combustion engine (not shown) flows on the primary side. The air, after flowing through the water-/air heat exchanger 3, is guided into the motor-vehicle interior, also not shown.

The water/air heat exchanger 3 has a middle tank 4, into which opens a feed pipe 5 for the cooling water from the engine. The water/air heat exchanger also has two lateral water tanks 6, 7, which function as return-water tanks, from each of which extends a return pipe 8, 9 for the cooling water. Between the middle water tank 4 and each lateral water tank 6, 7, is a heat-exchange panel 10, 11 for the two sides of the interior respectively.

A water/water heat exchanger 12, 13 is built laterally onto each of the lateral water tanks 6, 7. The cooling water, after flowing through the water/air heat exchangers 3, flows through these water/water heat exchangers 12, 13 from their primary sides. Water is guided through a feed pipe 14, 15 and a return pipe 16, 17 on each side of the interior to panel heat exchangers 18 to 22 in the vehicle interior. From the panel heat exchangers 18 to 22, the water returns to the water/water heat exchangers 12, 13 into their secondary sides. These panel heat exchangers, which are provided for each side of the vehicle interior, but are only shown schematically in the drawing for the right-hand side of the interior, are arranged in the vehicle front floor panel 18, the vehicle front door 19, the vehicle rear floor panel 20, the vehicle rear door panel 21 and the vehicle rear backrest 22. An expansion vessel 23 and a pump 24 for circulating the water in this circuit are installed in the return 17. A similar expansion vessel and pump are installed in the return 16.

By means of the system described, the interior can be both heated and cooled by the direct introduction of air and by the panel heat exchangers 18 to 22. The system allows for the separate control of the two sides of the interior.

During the heating of the interior, the evaporator is inactive, while cooling water is supplied to the two heat-exchange panels 10, 11. The quantities of cooling water in the two returns 8 and 9 are controlled separately. At differing settings, cooling water of varying temperature is supplied to the two water/water heat exchangers 12, 13. This allows the heating control by the panel heat exchangers 18 to 22 to be incorporated in the general heating control. In any event, the temperature of the water supplied to the panel heat exchangers 18 to 22 is relatively low. This is because the water/water heat exchangers 12, 13 are arranged downstream of the heat-exchange panels 10, 11, and the cooling water has already given off some of its heat energy in the panels 10, 11 before it heats the water in the water/water heat exchangers 12, 13.

During the cooling of the interior, the water/air heat exchanger 3 and the water/water heat exchangers 12, 13 are isolated from the remaining engine cooling circuit. The air flowing through the air channel 1 is cooled in the evaporator 2 and then cools the cooling water in the water/air heat exchanger 3, from where it is guided into the interior of the vehicle. In the water/water heat exchangers 12, 13, the now cooled cooling water will cool the water conveyed to the panel heat exchangers 18 to 22. To assist the circulation of the cooling water in the water/air heat exchanger 3 and the water/water heat exchangers 12, 13, bypass lines 25, 26 are installed between the returns 8, 9 and the feed pipe 5. The bypass lines 25, 26 have circulating pumps 27, 28 which convey Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A system for the air-conditioning of an interior of a motor vehicle having an engine cooling circuit, and panel heat exchanger means in the interior of the motor vehicle, said system comprising:

water/air heat exchanger means for heating vehicle interior air;

water/water heat exchanger means connected in series with and downstream of said water/air heat exchanger means in said engine cooling circuit;

said water/water heat exchanger means being in flow connection between said water/air heat exchanger means and said panel heat exchanger means;

further comprising at least one cooling-water return pipe, at least one feed pipe, and at least one connecting pipe which connects said return pipe and said feed pipe and is parallel to said water/air heat exchanger means; and further comprising a circulating pump in said connecting pipe for pumping water from said cooling-water return pipe to said feed pipe.

2. The system of claim 1, wherein said water/air heat exchanger means and said water/water heat exchanger means are formed as a single unit.

3. The system of claim 2, wherein the water/air heat exchanger means includes at least one return-water tank, said water/water heat exchanger means forming at least part of said return-water tank.

4. The system of claim 2, wherein the water/air heat exchanger means includes at least one return-water tank and wherein said water/water heat exchanger means is built onto said return-water tank.

5. The system of claim 1, further comprising an evaporator upstream of said water/air heat exchanger means in a stream of air guidable into said interior of the vehicle.

* * * * *